United States Patent
Röver et al.

(10) Patent No.: US 7,774,609 B2
(45) Date of Patent: *Aug. 10, 2010

(54) PROCESS FOR DIGITAL SIGNING OF A MESSAGE

(75) Inventors: Stefan Röver, Holzgerlingen (DE); Hans-Dieter Groffman, Hirrlingen (DE)

(73) Assignee: First Data Mobile Holdings Limited, Dublin (IE)

( * ) Notice: Subject to any disclaimer, the term of this patent is extended or adjusted under 35 U.S.C. 154(b) by 50 days.

This patent is subject to a terminal disclaimer.

(21) Appl. No.: 12/102,731

(22) Filed: Apr. 14, 2008

(65) Prior Publication Data

US 2009/0034730 A1 Feb. 5, 2009

Related U.S. Application Data

(63) Continuation of application No. 09/530,334, filed as application No. PCT/EP98/06769 on Jun. 10, 2000, now Pat. No. 7,386,727.

(30) Foreign Application Priority Data

Oct. 28, 1997 (DE) ................................ 197 47 603

(51) Int. Cl.
*H04L 9/00* (2006.01)
*H04K 1/00* (2006.01)
*H04M 1/66* (2006.01)

(52) U.S. Cl. ........................ 713/176; 713/172; 713/182; 380/247; 380/270; 705/17; 705/18; 705/70; 455/410

(58) Field of Classification Search .................. 713/172, 713/176, 182; 380/247, 270; 705/17–18, 705/70; 235/380; 455/410
See application file for complete search history.

(56) References Cited

U.S. PATENT DOCUMENTS

| 4,405,829 A | 9/1983 | Rivest et al. |
| 4,529,870 A | 7/1985 | Chaum |
| 4,679,236 A | 7/1987 | Davies |

(Continued)

FOREIGN PATENT DOCUMENTS

CH              683052           12/1993

(Continued)

OTHER PUBLICATIONS

Der HBCI-Standard- Was bedeutet "HBCI (Home Banking Computer Interface)"? An English synopsis of the document is included.

(Continued)

*Primary Examiner*—Minh Dieu Nguyen
(74) *Attorney, Agent, or Firm*—Townsend and Townsend and Crew LLP

(57) ABSTRACT

A method and apparatus for the digital signing of a message to be signed, the message to be signed is transmitted via a communication network to a mobile radio telephone to be used as a signing unit. A message to be signed is transmitted from a transmitter to a receiver and then from the receiver to the mobile radio telephone via a telephone network. The mobile radio telephone user indicates that the message to be signed should be signed, and the mobile radio telephone generates a signed message. The signed message is then transmitted from the mobile radio telephone to the receiver and from the receiver to an addressee.

19 Claims, 3 Drawing Sheets

U.S. PATENT DOCUMENTS

Figure 1:
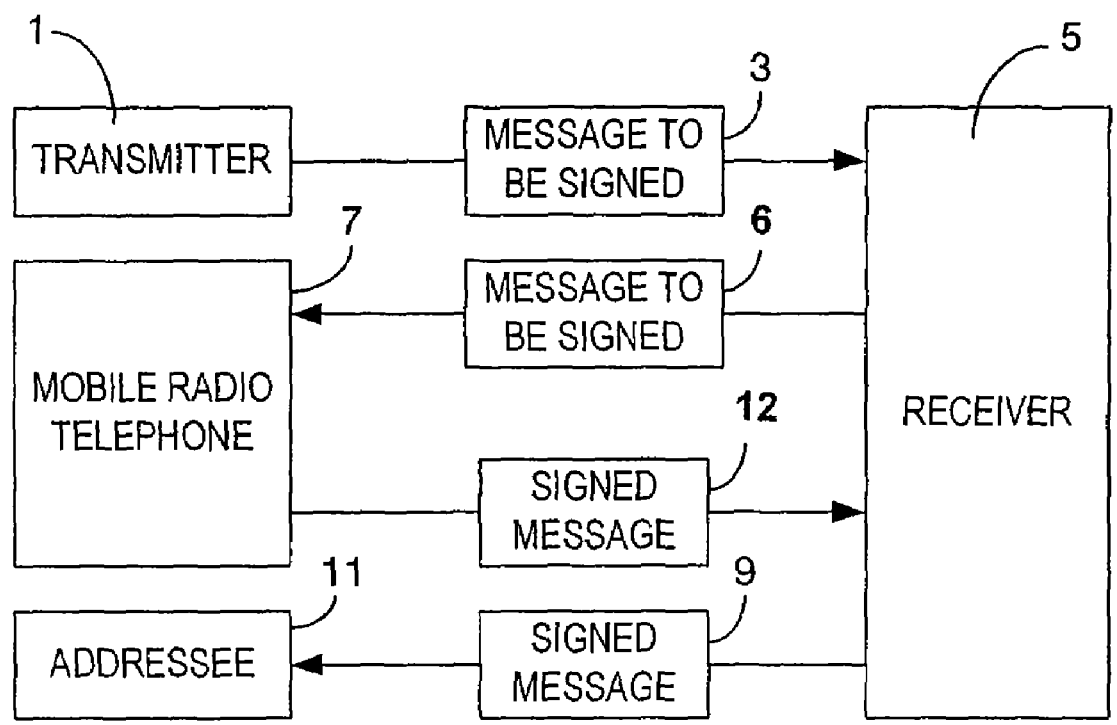

| | | | |
|---|---|---|---|
| 4,995,082 A | 2/1991 | Schnorr | |
| 5,050,207 A | 9/1991 | Hitchcock | |
| 5,191,613 A | 3/1993 | Graziano et al. | |
| 5,299,262 A | 3/1994 | Brickell et al. | |
| 5,373,561 A | 12/1994 | Haber et al. | |
| 5,416,842 A | 5/1995 | Aziz | |
| 5,440,633 A | 8/1995 | Augustine et al. | |
| 5,455,863 A | 10/1995 | Brown et al. | |
| 5,511,121 A | 4/1996 | Yacobi | |
| 5,524,052 A | 6/1996 | Augustine et al. | |
| 5,544,255 A | 8/1996 | Smithies et al. | |
| 5,546,463 A | 8/1996 | Caputo et al. | |
| 5,548,106 A | 8/1996 | Liang et al. | |
| 5,613,012 A | 3/1997 | Hoffman et al. | |
| 5,621,797 A | 4/1997 | Rosen | |
| 5,623,637 A | 4/1997 | Jones et al. | |
| 5,629,982 A | 5/1997 | Micali | |
| 5,647,017 A | 7/1997 | Smithies et al. | |
| 5,668,876 A | 9/1997 | Falk et al. | |
| 5,724,423 A | 3/1998 | Khello | |
| 5,724,425 A | 3/1998 | Chang et al. | |
| 5,778,071 A | 7/1998 | Caputo et al. | |
| 5,784,464 A | 7/1998 | Akiyama et al. | |
| 5,787,175 A | 7/1998 | Carter | |
| 5,796,832 A | 8/1998 | Kawan | |
| 5,799,086 A | 8/1998 | Sudia | |
| 5,805,719 A | 9/1998 | Pare, Jr. et al. | |
| 5,809,145 A | 9/1998 | Slik et al. | |
| 5,818,955 A | 10/1998 | Smithies et al. | |
| 5,838,812 A | 11/1998 | Pare, Jr. et al. | |
| 5,862,325 A | 1/1999 | Reed et al. | |
| 5,872,848 A | 2/1999 | Romney et al. | |
| 5,872,849 A | 2/1999 | Sudia et al. | |
| 5,875,404 A | 2/1999 | Messiet | |
| 5,878,142 A | 3/1999 | Caputo et al. | |
| 5,886,333 A | 3/1999 | Miyake | |
| 5,903,880 A | 5/1999 | Biffar | |
| 5,909,491 A | 6/1999 | Lui | |
| 5,917,913 A | 6/1999 | Wang | |
| 5,943,423 A | 8/1999 | Muftic | |
| 5,948,103 A | 9/1999 | Fukuzaki | |
| 5,960,085 A | 9/1999 | de la Huerga | |
| 6,009,177 A | 12/1999 | Sudia | |
| 6,018,724 A | 1/2000 | Arent | |
| 6,038,549 A | 3/2000 | Davis et al. | |
| 6,041,314 A | 3/2000 | Davis | |
| 6,047,269 A | 4/2000 | Diffar | |
| 6,055,236 A | 4/2000 | Nessett et al. | |
| 6,061,791 A | 5/2000 | Moreau | |
| 6,064,751 A | 5/2000 | Smithies et al. | |
| 6,085,320 A | 7/2000 | Kaliski, Jr. | |
| 6,088,717 A | 7/2000 | Reed et al. | |
| 6,091,835 A | 7/2000 | Smithies et al. | |
| 6,105,006 A | 8/2000 | Davis et al. | |
| 6,115,601 A | 9/2000 | Ferreira | |
| 6,142,369 A | 11/2000 | Jonstromer | |
| 6,148,405 A | 11/2000 | Liao et al. | |
| 6,157,920 A | 12/2000 | Jakobsson et al. | |
| 6,175,922 B1 | 1/2001 | Wang | |
| 6,189,098 B1 | 2/2001 | Kaliski, Jr. | |
| 6,205,435 B1 | 3/2001 | Biffar | |
| 6,213,391 B1 | 4/2001 | Lewis | |
| 6,223,291 B1 | 4/2001 | Puhl et al. | |
| 6,240,091 B1 | 5/2001 | Ginzboorg et al. | |
| 6,243,480 B1 | 6/2001 | Zhao et al. | |
| 6,282,522 B1 | 8/2001 | Davis et al. | |
| 6,311,167 B1 | 10/2001 | Davis et al. | |
| 6,314,468 B1 | 11/2001 | Murphy et al. | |
| 6,314,519 B1 | 11/2001 | Davis et al. | |
| 6,325,292 B1 | 12/2001 | Sehr | |
| 6,332,133 B1 | 12/2001 | Takayama | |
| 6,367,013 B1 | 4/2002 | Bisbee et al. | |
| 6,381,344 B1 | 4/2002 | Smithies et al. | |
| 6,394,341 B1 | 5/2002 | Makipaa et al. | |
| 6,397,261 B1 | 5/2002 | Eldridge et al. | |
| 6,404,337 B1 | 6/2002 | Van Till et al. | |
| 6,490,367 B1 | 12/2002 | Carlsson et al. | |
| 7,043,456 B2 | 5/2006 | Lindskog et al. | |
| 7,386,727 B1 | 6/2008 | Rover et al. | |
| 2005/0250471 A1 | 11/2005 | Philipeit | |

FOREIGN PATENT DOCUMENTS

| | | |
|---|---|---|
| DE | 4201197 A1 | 7/1993 |
| DE | 4333388 A1 | 4/1995 |
| DE | 4406590 A1 | 9/1995 |
| DE | 4406602 A1 | 9/1995 |
| DE | 442097 A1 | 12/1995 |
| DE | 3704814 C2 | 5/1996 |
| DE | 19548581 A1 | 7/1997 |
| DE | 19609232 A1 | 9/1997 |
| DE | 29717520 U1 | 11/1997 |
| DE | 19622533 A1 | 12/1997 |
| DE | 4201197 C2 | 1/1998 |
| DE | 19618471 A1 | 1/1998 |
| DE | 4335317 C2 | 2/1998 |
| DE | 19634418 A1 | 3/1998 |
| DE | 19724901 A1 | 12/1998 |
| DE | 19747603 | 5/1999 |
| DE | 19844677 | 2/2000 |
| DE | 10049164 A1 | 4/2002 |
| EP | 0689316 A2 | 12/1995 |
| EP | 0555992 | 9/1996 |
| EP | 0481714 | 1/1997 |
| EP | 0777394 A1 | 4/1997 |
| EP | 0562890 | 6/2000 |
| FI | 945075 A1 | 4/1996 |
| JP | 3-1629 | 3/1991 |
| JP | 6-501571 | 6/1994 |
| JP | 8-511144 | 8/1996 |
| SE | 467559 | 8/1992 |
| WO | WO90/13213 | 11/1990 |
| WO | WO92/03000 | 2/1992 |
| WO | WO92/14329 | 8/1992 |
| WO | WO93/26131 | 12/1993 |
| WO | WO94/08433 | 12/1993 |
| WO | WO94/11849 | 5/1994 |
| WO | WO95/35635 | 12/1995 |
| WO | WO96/03830 | 2/1996 |
| WO | WO96/13814 | 5/1996 |
| WO | WO96/32700 | 10/1996 |
| WO | WO97/37461 | 10/1997 |
| WO | WO00/52866 | 9/2000 |

OTHER PUBLICATIONS

Micheli, Uwe; Sicherheitsfunktionen im paneuropaischen Mobilfunknets, DeTeCon Deutsche Telepost Consulting GmbH, Einfuhrungsveranstaitung vom Aug. 10-Nov. 10, 1991. An English synopsis of the document is included.

"RSA [Rivest, Shamir and Adelman algorithm] Enters Wireless Arena," Jan. 12, 1994, Redwood City, CA.

"Motorola to Apply RSA Technology to Family of Information Security Products for Worldwide Communication of Sensitive Data," Oct. 16, 1995, Redwood City, CA.

"Unwired Planet Chooses RSA Technology for Wireless Internet Platform," Jul. 8, 1997, Redwood City, CA.

Rott, Christian; E-Cash: Stocktaking, Student of the economical informatics for the practical course from experimental Economics, Jan. 1998, Vienna. An English translation of the document is included.

Murch, Allan; Stiffe, Peter; "Cellular Data Services over GSM" Microwave Journal, USA, vol. 38, No. 7, Jul. 1995, ISSN 0026-2897, p. 90, 92, 94, 96 XP000524891.

Irlbeck, Thomas; "Digital Signature," Computer-Lexikin, Beck EDV Consultants A-Z. An English translation of the document is included.
Digital Cellular Telecommunications System (Phase 2+): Technical Realization of the Short Message Service (SMS); Point-to-point (PP) (GSM 03.40).
Pfitzmann, Andreas; Pfitzmann, Birgit; Schunter, Matthias, Waidner, Michael; Mobile User Devices and Security Modules: Design for Trustworthiness, Feb. 5, 1996.
Elgamal, Taher; "A Public Key Cryptosystem and a Signature Scheme Based on Discrete Logarithms," Jul. 1985, IEEE Transaction Information Theory; 1985 vol. IT31 pp. 469-472.
Chaum, David; Fiat, Amos; Naor, Moni; "Untraceable Elctronic Cash" Session 9, Protocols, University of Montreal, pp. 319-327.
Donn, Ivan; "Smart Cards in GSM," Elektron, Feb. 1994.
Grigorova, Theodora, Leung, Ivan; "SIM Cards," Telecommunication Journal of Australia, vol. 43, No. 2, 1993 AU, pp. 33-38.
Herold, Von Sven; "Hintergrund: Was ist HBCI?," May 10, 2001, ZDF, MSNBC. An English synopsis of this document is included.
Lukas, Sylvia; "Cyber Money—Kunstliches Geld in Internet and Elektronischen Geldborsen," pp. 122-123, 1997, Herman Luchterhand Verlag, Neuwied, Krifte/Ts., Berlin. An English synopsis of the document is included.
Volpe, Frances P.; Volpe, Safinaz; "Chipkarten," pp. 62-65, Verlag Heinz Heise GmbH & Co KG, Hannover. An English synopsis of the document is included.
Horster, Patrick; "Trust Center," pp. 1-9, 154-157, 1995, Friedr. Vieweg & Sohn Verlagsgesellschafte mbH, Braunschweig/ Wiesbaden, 1995. An English synopsis of the document is included.
Bellare, Mihir; Garay, Juan A.; Hauser, Ralf; Herzberg, Amir; Krawcyzk, Hugo; Tsudik, Gene; Waidner, Michael; "iKP—A Family of Secure Electronic Payment Protocols," Aug. 2, 1995.
An English translation of a portion of FI 945075 (cite FY).
An English translation of a portion of DE 4406590 (cite FA).
An English translation of a portion of DE 19609232 (cite FB).
An English translation of a portion of DE 3704814 (cite FC).
An English translation of a portion of DE 19622533 (cite FD).
An English translation of a portion of DE 19548581 (cite FE).
An English translation of a portion of DE 19634418 (cite FG).
An English translation of a portion of DE 19618471 (cite FH).
An English translation of a portion of DE 4333388 (cite FI).
An English translation of a portion of DE 4201197 (cite FJ).
An English translation of a portion of DE 19844677 (cite FL).
An English translation of a portion of DE 10049164 (cite FM).
An English translation of a portion of DE 19747603 (cite OF).
An English translation of a portion of WO95/35635 (cite FP).
An English translation of WO93/26131 (cite FQ).
An English translation of WO94/08433 (cite FR).
An English translation of WO94/11849 (cite FS).
An English translation of WO90/13213 (cite FT).
An English translation of WO92/14329 (cite FU).
An English translation of EP0555992 (cite FV).
An English translation of EP0562890 (cite FW).
An English translation of EP0481714 (cite FX).
An English translation of a portion of CH 683052 (cite FZ).
An English translation of a portion of SE 467559 (cite FAA).
An English translation of a portion of WO96/13814 (cite FAB).
An English translation of a portion of EP 0777394 (cite FAC).
An English translation of a portion of DE 29717520 (cite FF).
An English translation of a portion of DE 4335317 (cite FK).
An English translation of a portion of DE 4420967 (cite FN).

PROCESS FOR DIGITAL SIGNING OF A MESSAGE

CROSS-REFERENCES TO RELATED APPLICATIONS

This application is a continuation of patent application Ser. No. 09/530,334 filed Jun. 10, 2000, entitled "METHOD FOR DIGITAL SIGNING OF A MESSAGE," that issued as U.S. Pat. No. 7,386,727 on Jun. 10, 2008, which is National Stage Entry No. PCT/EP98/06769, with a 371(c) date of Jun. 10, 2000, the entire disclosure of which is incorporated herein by reference for all purposes.

This application also claims the benefit of the filing date of European Patent Application No. EP 19747603.1, entitled "METHOD FOR DIGITAL SIGNING OF A MESSAGE," filed Oct. 28, 1997 the entire disclosure of which is incorporated herein by reference for all purposes.

The present invention relates to a process for the digital signing of a message and to a system required for practising this process.

Digital signatures, ie., electronic signatures, are usually made with the aid of so-called public-key processes. In these processes, to the signer there is assigned a pair of keys which consist of a secret key and a public key. A signature is generated by means of the secret key with a mathematical algorithm, and this signature can be verified with the associated public key. The secret key can be controlled only by the signer so that nobody is able to sign in the name of the signer. The public key, by contrast, may be published so that anybody can verify the signature. The secret key is usually protected through a PIN so that for making a signature, knowledge of the PIN and possession of the secret key are required.

Digital signatures can be generated in a computer, eg., in a PC, with the aid of software programs. The associated secret key is usually stored on a hard disk or a diskette and downloaded into the main memory for generating the signature. In most instances, the secret key proper is, in turn, stored in encoded form and protected via a PIN which the owner has to input when signing via the software. This is to ensure that only the owner of the secret key can use the same for signing. Since no additional hardware is required, this process is advantageous in regard to costs. It turns out to be a shortcoming that the user must rely on the signature software's integrity and that the same is not deemed sufficiently safe.

Hardware-based processes are an alternative for generating digital signatures in a computer. These processes for signing make use of special systems in which the display component and the keyboard are coupled with the signature component by hardware in a way such that the connection cannot be influenced. These systems are usually connected to the computer via a galvanic connection, eg., a cable to the serial interface. These systems have their own display component which displays the message to be signed, and their own keyboard, the so-called PIN pad through which the PIN is inputted for making the key available. The secret key is usually not stored in the signing unit but rather on a chipcard which can be introduced into the system. The signature proper can be generated on the chipcard (in the case of chipcards with incorporated cryptoprocessor) or in the system. The above-described hardware-based process forms a closed signing system consisting of the display component, the keyboard, the reader, and the chip card.

Hardware-based processes are significantly safer than software-based processes but their costs are higher. Accordingly, so-called hybrid processes are used at the present time. In these, the secret keys are in most cases stored on a chipcard and made available via a reader instrument. The other tasks, such as display, inputting of the PIN, and signature generation are fully or partially carried out in the computer. It may be provided that the signature unit, ie., the reader and the chipcard, is used as a pure storage medium for the secret key, whereas the display, the inputting of the PIN, and the generation of the signature are entirely carried out in the computer.

It can be provided as an alternative to effect the display and the inputting of the PIN through the computer; in this case, the signing unit is used for signature generation, in addition to storing the secret key. Finally, there exists a version in which only the display is effected in the computer. In this version, the signing unit has its own keyboard or it is directly connected with the computer keyboard under exclusion of the computer software. The signature is generated in the signing unit. This process is the more cost-saving the fewer tasks must be carried out by the computer software and the lower the performance requirements to the signing unit.

However, in all this embodiments there is the basic problem that there must be signed precisely the data which the user wants to sign. It must be precluded that a virus affects the data, for example during the transmission from the display component, eg., from the display, to the signing component, eg., the cryptoprocessor. Furthermore, it must be ensured that a secret number (eg., the PIN), which is required to trigger signatures, cannot be read from the keyboard by other programs and does not become known to third parties.

Furthermore, the large-scale utilisation of the option of digital signing is limited by the comparatively small distribution of signing units. In fields of the potential application of digital signatures, eg., in internet banking, therefore a costly infrastructure would have to be set up to spread the use of signing units. Also the installation of signing units at the computer is problematic. On the one hand, the units must be physically connected to the computer, yet all the serial interfaces of a PC are often already in use. Alternative processes for incorporating signing units in computers are likewise problematic, since for this purpose software drivers and, sometimes, even additional hardware are required. Apart from this, for all signing units there must be implemented special software components which allow the user to communicate with the signing unit.

A further problem of the conventional processes for digital signatures results from the fact that they are location-dependent. Particular fields of application of digital signatures, eg., internet banking, are location-independent in view of the everywhere accessible public internet terminals. If these internet banking applications were combined with the known location-dependent processes for digital signing, the independence of the location would be lost in these applications.

A low-cost, easy-to-build, and location-independent process for the digital signing of communications and the provision of appropriate means are the technological problems underlying the present invention.

These technological problems are solved through the teachings according to the main claim. Thus, the invention creates a process for digital signing of a message which is transmitted via a communication network to a signing unit and is to be signed, with the message to be signed being transmitted to the signing unit via a telephone network. In a particularly preferred embodiment of the invention, the signing unit is a mobile radio telephone and, accordingly, the mobile phone network is the communication network.

In the context of the present invention, digital signing of a message is understood as a procedure in which the intent to deliver a message and its contents are confirmed electronically. This is effected by partial or full encoding of the message to be signed or by encoding of a cryptographic check sum of this message into a signed message by means of a secret key and by making use of an algorithm. In the context of the present invention, a signed message is understood either as the message as a whole or as the signature proper. Signing serves for being able to identify the user later on. In the context of the present invention, a signed message is understood also as merely the electronically generated signature of the message. In the context of the present invention, a message is understood as any kind of electronically reproducible information, for example, numbers, characters, combinations of numbers, combinations of characters, graphs, tables, etc. In the context of the present invention, a signing unit is understood as a unit which can perform the signing of the message, ie., which comprises a secret key, a mathematical encoding procedure, facilities for dialog with the signer or user, optionally the required interfaces, and a transmitting and receiving system. This unit can be composed of various elements, for example, of a chipcard and a reader or a chipcard and a mobile radio telephone. In the context of the present invention, signing means are understood as a component of the signing unit, including the secret key and/or the encoding procedure and/or an interface with the two or one of the aforementioned components.

Based on the—according to the invention particularly preferred—use of the radio telephone net for transmitting messages to be signed to a signing unit, which, in an advantageous embodiment is a mobile radio telephone, it is possible to transmit messages to the signing unit from a commercial computer having a connection to an appropriate message server, eg., by e-mail, without need for implementing or modifying anything at the computer.

In a particularly preferred embodiment, the invention envisages a process of the above-identified type in which the message to be signed is transmitted, from a transmitter to be termed a message source, eg., a PC, to a receiver, eg., a message server, in which this message is thereafter transmitted from the receiver to a signing unit associated with the transmitter, particularly to a mobile radio telephone, with this message thereafter signed in the mobile radio telephone and retransmitted to the receiver as signature, ie., as signed message.

Thus, the invention provides that an unsigned message or a message to be signed is transmitted from a message source to a receiver, for example, to a message server. Then the receiver associates the message to be signed with the signing unit, particularly with the mobile radio telephone. This is effected either via documentation stored in the receiver or via information which, together with the message to be signed, was transmitted from the transmitter to the receiver. The association of the signing unit, advantageously of the mobile radio telephone, with the message source therefore need not be a spacewise localised association but is an association purely through information. The association involves the determination of the signing unit and, hence, of the user who has to sign the received message to be signed. The mobile radio telephone which is used in the preferred embodiment of the invention can advantageously display a message to be signed and, when instructed by the user, can effect the signing with the aid of the advantageously employed chipcard. The message signed in this way is transmitted to the receiver and there optionally compared with the original message and identified as authentic. The signed message, which is optionally identified as authentic, is then transferred to an addressee.

The invention also relates to an above-indicated process m which it is provided in advantageous fashion to use a public-key process for signing, wherein the transmitter has an associated secret key and the receiver has a corresponding public key associated with the secret key. This procedure has the advantage of not necessitating the transmission of the keys.

In a further advantageous embodiment, the invention relates to an above-indicated process in which the message to be signed, or the previously signed message, ie., for example, the signature, is transmitted between the receiver and the signing unit, particularly the mobile radio telephone, by means of short-message service (SMS). In a particularly preferred embodiment, it can be provided that both the transmission of the message to be signed from the receiver to the mobile radio telephone and the transmission of the signed message or of the signature from the mobile radio telephone to the receiver are carried out by SMS.

In a further embodiment, the invention provides that the message to be signed is displayed by means of a display provided in the mobile radio telephone. This can be the display of conventional mobile radio telephones. In this way, simple texts, such as, for example, banking transactions or even simple graphs, can be readily displayed.

Following this optionally provided display, the user gives an appropriate instruction in a corresponding dialog for triggering the signing operation. In a particularly preferred embodiment, the invention provides a process of the above-indicated type in which the secret key required for signing is stored in a chipcard of the mobile radio telephone and in which this key is activated by means of a secret number (termed PIN in what follows) capable of being inputted from the key pad of the mobile radio telephone. By corresponding appropriate programming of the mobile radio telephone it can be ensured in advantageous fashion that the inputted PIN is transmitted only to the chipcard and cannot be recognised from the outside.

In a further alternative embodiment of the aforementioned process according to the invention, it is provided to input the secret key required for signing via the key pad of the mobile radio telephone.

It is provided in a further preferred embodiment of the invention that in one of the aforementioned processes, the secret key is stored not only on the chipcard of the mobile radio telephone but that there also the signing of the message is effected. In this way it is ensured in advantageous fashion that the secret key does in no event leave the chipcard and therefore cannot be used by unauthorised persons.

It is provided in a further preferred embodiment of the invention that the mobile radio telephone is used not only for signing the message but, in addition, as the sender for transmitting the signed message to the receiver.

The invention also relates to means for practising the aforementioned processes, particularly mobile radio telephones and chipcards.

In a further preferred embodiment of the invention there is provided a mobile radio telephone which comprises a key pad, display means, and chipcard means for reading and/or writing of a chipcard adapted to be inserted into the mobile radio telephone, wherein there are provided, in addition, signing means which are suitable, for example, for communicating with a chipcard according to the invention and/or for generating a signed message from a message to be signed. The signing means are advantageously connected with the key pad for inputting a secret key or a PIN.

In a particularly advantageous embodiment of the aforementioned mobile radio telephone, it is provided that the signing means represent a software component at variance with the conventional software component of a mobile radio telephone. In a preferred embodiment of the invention, this modified software component is suitable for carrying out the signing of the message after dialog with the user. In a further embodiment, the modified software component, which is provided according to the invention, is advantageously capable of communicating with the chipcard according to the invention for carrying out the signing according to the invention. It is provided in a particularly advantageous embodiment of the invention that the signing means of the signing unit can work with additional algorithms which facilitate the display of the message to be signed on the display field of the mobile radio telephone.

Thus, the present invention in particularly advantageous fashion makes available a system in which only the software components have to be modified relative to the conventionally employed software components. No modification of the hardware is required.

In a further embodiment of the invention, the invention also relates to the chipcard for mobile radio telephones, particularly for the aforementioned mobile radio telephones, wherein the chipcard comprises signing means capable of storing the secret key of the user. Advantageously, the signing means of the chip card are additionally capable of generating a signed message from a message received by the mobile radio telephone, ie., from a message to be signed. In the context of the present invention, the signing means of a chipcard according to the invention are understood as means which store the secret key of the user and, in an advantageous embodiment, also carry out the signing. The signing need not be carried out directly on the chip card but can be effected by a software component and/or hardware component in the mobile radio telephone.

Other advantageous embodiments of the invention will become obvious from the dependent claims.

The invention will be explained in detail with reference to the figures and the associated exemplary embodiment.

Figure 2:
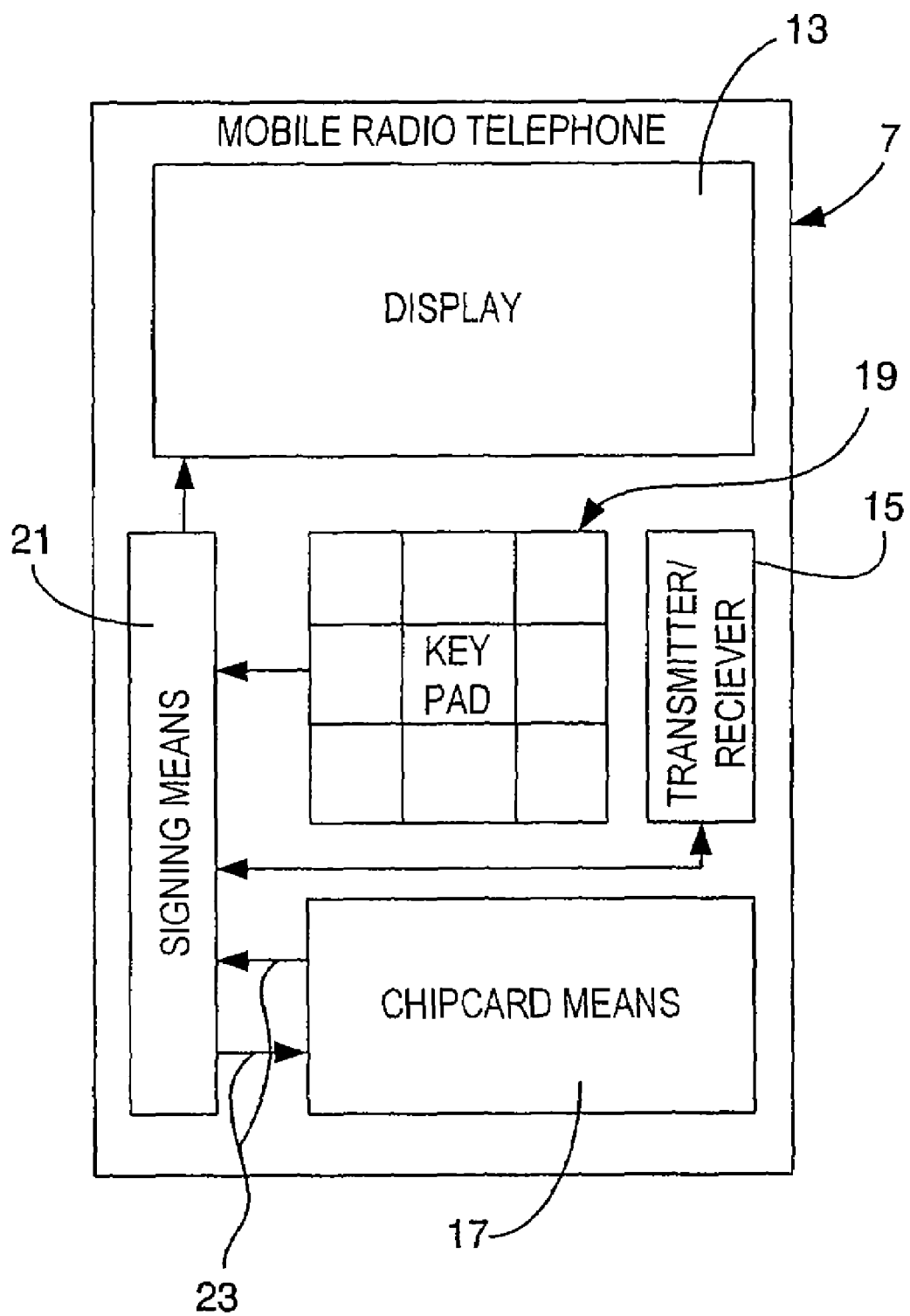
Figure 3:
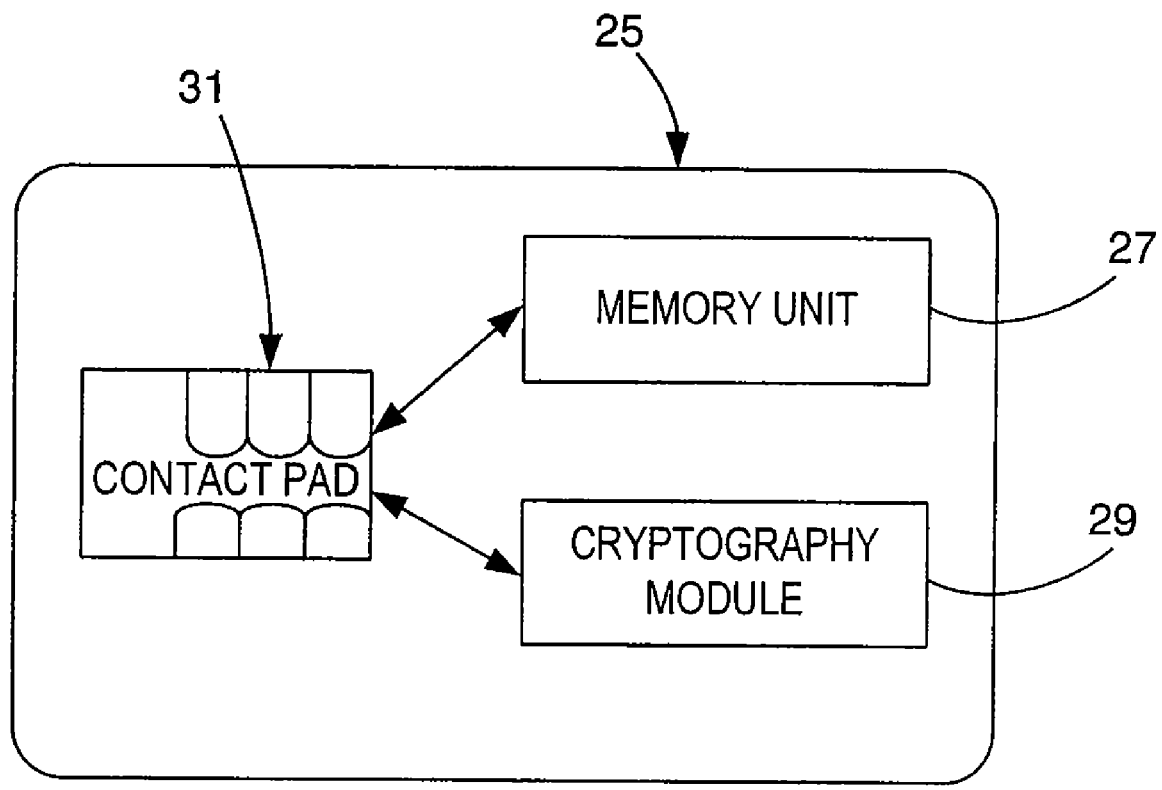

The figures show:

FIG. 1, the operational sequence of the process according to the invention;

FIG. 2, the schematic structure of a mobile radio telephone according to the invention; and FIG. 3, a schematic representation of a chip card according to the invention.

FIG. 1 shows the transmitter 1 which can be configured as a PC having a text editor or a home banking program, a message 2 to be signed, a receiver 3 which is configured as a message server, a mobile radio telephone 7, a signed message 9, and an addressee 11.

A message 3 to be signed is sent, eg., by e-mail, to the receiver 3 with the aid of the home banking program incorporated in the transmitter 1. The receiver 5 converts the received message, which is to be signed, into a message which can be sent to the mobile radio telephone 7, particularly by means of a mobile-phone radio net, and though SMS, in an advantageous embodiment. The receiver 5 associates the message 3 to be signed with the mobile radio telephone 7, for example by means of data stored in the receiver 5. It may also be provided that the association is effected by means of data sent by the transmitter 1 together with the message to be signed. These data are, in general, the phone number of the mobile radio telephone.

The received message 3 is displayed in the mobile radio telephone 7 on a display 13. The precise operation will be explained in detail in the description pertaining to FIG. 2. After displaying the message 3 to be signed on the display 13, the message 3 to be signed is being signed upon instruction by the user and the signed message 9 is passed on to the receiver 5 or to some other receiver. Transmission of the signed message 9 from the mobile radio telephone 7 to the receiver 5 is likewise effected though SMS. The receiver 5 is capable of comparing the signed message 9 with the original message 3 to be signed and transmit it thereafter to an addressee 11. Transmission to the addressee 11 can be carried out in any form.

FIG. 2 illustrates a mobile radio telephone 7. The mobile radio telephone 7 comprises a display 13, a transmitter/receiver 15, chipcard means 17, a key pad 19, and signing means 21.

The message 3 to be signed, which is transmitted from the receiver 5, is received by the transmitter/receiver 15 of the mobile radio telephone 7 and, if necessary, passed on in modified form to the signing means 21. The signing means 21 take care of the internal control of the signing operation. The signing means 21 comprise software components for controlling the display 13 so that the message 3 to be signed can be made visible. Furthermore, the message 3 to be signed is signed within the signing means 21. In order to be able to carry out the signing operation, the signing means 21 must communicate with the chipcard means 17. Furthermore, it is necessary that the secret key proper or the PIN is inputted to the signing means 21 via the key pad. If the PIN, which is usually shorter, ie., which has fewer digits than the secret key, is inputted by the user via the key pad 19, the PIN can—so to speak—activate the unwieldy secret key for the signing operation by means of the operating system of the chipcard 25. The signing means 21 can communicate with the chipcard 25 via a bidirectional connection line 23. The chipcard means 27 ensure that the commands of the signing means 21 are executed and that the signed message 9 is passed on to the transmitter/receiver 15 via the signing means 21. This means that the chipcard means 27 form an interface between the signing means 21 and the chipcard 25.

FIG. 3 shows—in very simplified, schematic form—a chipcard 25 according to the invention. It comprises basically a contact pad 31, a memory unit 27, and a cryptography module 29. The secret key required for generating the signed message 9 is stored in the memory unit 27. The cryptography module 29 serves for encoding the message 3 to be signed, for example, by means of an RSA process. The memory unit 27 or the cryptography module 29 can communicate with the chipcard 27 via the contact pad 31. Other elements required for the operation of the chipcard 25, eg., a controller, are not shown in FIG. 3 for the sake of clarity of the representation.

The invention claimed is:

1. A method for digitally signing a message which is transmitted via a communication network from a first receiver, the method comprising:
    receiving a message to be signed at the first receiver via a first network;
    transmitting the message to be signed from the first receiver via a second network, the second network comprising a telephone network to a mobile radio telephone comprising a signing unit, the telephone network comprising a mobile radio telephone network, the mobile radio telephone associated with the telephone network;
    signing the message to be signed via the mobile radio telephone, thereby forming a signed message; and
    transmitting the signed message to the first receiver.

2. The method according to claim 1, wherein signing the message comprises signing the message using a public-key process and an associated secret key and wherein the first receiver has a corresponding public key.

3. The method according to claim 2, wherein the secret key is inputted via a keyboard on the mobile radio telephone.

4. The method according to claim 2, wherein the secret key is stored on a chip card of the mobile radio telephone, the secret key being activated by a personal identification number (PIN) adapted to be inputted via a keyboard on the mobile radio telephone.

5. The method according to claim 4, wherein the chip card performs said signing step.

6. The method according to claim 4, wherein the mobile radio telephone performs said signing and wherein the secret key is read from the chip card.

7. The method according to claim 2, further comprising authenticating the signed message with the first receiver by comparing the signed message with the original message.

8. The method according to claim 1, wherein the message to be signed is transmitted between the first receiver and the mobile radio telephone via a Short-Message Service (SMS) message.

9. The method according to claim 1, wherein, prior to signing, the message to be signed is displayed on a display of the mobile radio telephone.

10. A system comprising:
a first network;
a second network comprising a telephone network;
a first receiver coupled with the first network and the second network, wherein the first receiver receives a message to be signed from the first network and transmits the message to be signed via the second network;
a mobile radio telephone with a signing unit coupled with the second network, wherein the mobile radio telephone receives the message to be signed from the second network, signs the message to be signed with the signing unit, thereby forming a signed message, and transmits the signed message to the first receiver via the second network.

11. The system according to claim 10, wherein the signing unit signs the message using a public-key process and an associated secret key and wherein the first receiver has a corresponding public key.

12. The system according to claim 11, wherein the secret key is inputted via a keyboard on the mobile radio telephone.

13. The system according to claim 11, wherein the secret key is stored on a chip card of the mobile radio telephone, the secret key being activated by a personal identification number (PIN) adapted to be inputted via a keyboard on the mobile radio telephone.

14. The system according to claim 13, wherein the chip card performs said signing step.

15. The system according to claim 13, wherein the secret key is read from the chip card by the signing unit.

16. The system according to claim 11, wherein the first receiver authenticates the signed message by comparing the signed message with the original message.

17. The system according to claim 10, wherein the message to be signed is transmitted between the first receiver and the mobile radio telephone via a Short-Message Service (SMS) message.

18. The system according to claim 10, wherein, prior to signing, the message to be signed is displayed on a display of the mobile radio telephone.

19. A method comprising:
receiving a message to be signed at a first receiver via a first network;
transmitting the message to be signed from the first receiver via a second network, the second network comprising a telephone network to a mobile radio telephone comprising a signing unit, the telephone network comprising a mobile radio telephone network, the mobile radio telephone associated with the telephone network; and
receiving the signed message, signed by the mobile radio telephone, at the first receiver.

* * * * *